United States Patent
Revankar et al.

(10) Patent No.: US 8,064,089 B2
(45) Date of Patent: Nov. 22, 2011

(54) AUTOMATIC INDEXING OF PRINTED DOCUMENTS

(75) Inventors: Shriram V. S. Revankar, Webster, NY (US); Daniel L. McCue, III, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1044 days.

(21) Appl. No.: 11/542,717

(22) Filed: Oct. 4, 2006

(65) Prior Publication Data

US 2008/0083823 A1   Apr. 10, 2008

(51) Int. Cl.
  *G06K 15/00* (2006.01)
  *G06F 3/12* (2006.01)
(52) U.S. Cl. ............... 358/1.16; 358/1.13; 358/1.14; 358/1.15; 358/1.17; 358/1.18
(58) Field of Classification Search .......... 358/1.1–1.18; 235/475, 375; 340/825.49, 572.3, 5.8, 572.1; 707/5, 2
See application file for complete search history.

(56) References Cited

U.S. PATENT DOCUMENTS

| | | | |
|---|---|---|---|
| 5,739,765 A * | 4/1998 | Stanfield et al. | 340/825.49 |
| 5,751,221 A | 5/1998 | Stanfield et al. | |
| 5,936,527 A * | 8/1999 | Isaacman et al. | 340/572.1 |
| 6,127,928 A * | 10/2000 | Issacman et al. | 340/572.1 |
| 6,407,665 B2 | 6/2002 | Maloney | |
| 6,816,075 B2 * | 11/2004 | Grunes et al. | 340/572.1 |
| 7,195,171 B2 * | 3/2007 | Oyama | 235/475 |
| 7,273,165 B2 * | 9/2007 | Satake et al. | 235/375 |
| 2006/0017950 A1 * | 1/2006 | Ikegami et al. | 358/1.13 |
| 2006/0145857 A1 * | 7/2006 | Ono | 340/572.3 |
| 2009/0315670 A1 * | 12/2009 | Naressi et al. | 340/5.8 |

* cited by examiner

*Primary Examiner* — Mark K Zimmerman
*Assistant Examiner* — Satwant Singh
(74) *Attorney, Agent, or Firm* — Wiggin and Dana LLP

(57) ABSTRACT

A system for automatically indexing printed documents comprising a database for maintaining indexing data indicative of the identity and location of the documents, a processor interfacing with the database, the processor producing a document file containing both a printable content and an RFID taggable content, a printing device for printing the documents including a controller, an RFID tag writer and an RFID tag dispenser, wherein the controller directs the printable content to the printing device and the taggable content to the RFID writer, a plurality of file folders for retaining the tagged documents, an RFID tag attached to each of the file folders and a storage unit for storing the plurality of tagged file folders.

39 Claims, 5 Drawing Sheets

AUTOMATIC INDEXING OF PRINTED DOCUMENTS

BACKGROUND

In a typical office environment, printed documents of various sorts are filed and stored in file cabinets, desks, shelves, drawers and other office furniture. Paper or plastic labels are affixed to the drawers or doors to describe the contents in a broad way. Labeled file folders or containers are used to group related papers in a drawer or on a shelf. In some sophisticated operations, indexes are manually created and maintained to record the documents that are supposed to be in each area, for example, card catalogs. If a document is erroneously filed, it may be lost for all practical purposes.

The retrieval of misplaced or lost files is time consuming and costly. In offices, warehouses and other facilities having large volumes of files, significant time and energy are frequently expended searching for missing or lost files.

In the past, a variety of systems have been implemented to track and control different sorts of objects, including files and printed documents. For example, in U.S. Pat. No. 6,407,665 issued to J. D. Stanfield et al. on May 12, 1998, which is incorporated by reference herein in its entirety, there is disclosed a tracking system including a processor which interfaces with a database, a plurality of file folder retainers and a plurality of file folders. The database includes file information, file location and a unique file address for the plurality of files in the system. The system actively maintains and updates the database by providing interactive communication between the processor, the folder retainers and the file folders. Communication is achieved by an electrical bus system to which the components are connected. Bus systems of this type are complicated, expensive to install and difficult to maintain in a typical office environment.

Radio frequency (RF) identification systems utilizing RFID tags are known in the art and are often used to identify an object and its location. In such a system, an RF signal is directed onto a tag attached to the object enabling the tag to emit a response. The system can determine from the response not only the identity of the object but also its location. RFID systems typically include an RFID reader or coupler, sometimes referred to as an "exciter", and an RFID tag which is attached to the object. Since the typical RFID reader or exciter communicates with the tagged object by RF energy, the reader does not require a direct line-of-sight between the reader and the tagged object. The object may be located inside a closed box, cabinet or drawer and may still be identified by the RFID reader.

In recent years, RFID systems have been used for identifying many different kinds of objects such as vehicles, animals, parcels, laundry, railroad cars and warehouse inventories, for example. However, such systems have enjoyed only limited success in tracking files and documents in an office environment. A reason for this limitation may be the enormity of the task of attaching RFID tags to literally thousands, if not millions, of printed documents and files that are generated in a typical office. In addition to printing the documents, each tag must be individually "written to" or embedded with a unique code identifying the document as well as other data and information indicative of its location, category, etc., in a storage system. The tag must then be attached to the documents in a separate operation either by hand or by use of some mechanical device.

Another problem has been that office documents are typically stored in metal cabinets which impede RF transmission and make difficult reading RFID tags placed inside the cabinets. In U.S. Pat. No. 6,127,928 issued to M. Issacman et al. on Oct. 3, 2000, which is incorporated by reference herein in its entirety, this problem is addressed by employing a host transceiver which transmits a coded RF signal, at a first frequency, to a local RFID reader inside the metal cabinet. The local reader then retransmits the coded signal at a second frequency via an antenna. A passive RFID tag containing the same code and attached to a document inside the cabinet, when in the vicinity of the antenna, is energized by the RF field and modulates the second frequency signal from the local reader. The second frequency signal modulated by the energized tag is then directly received by the host transceiver. Although these patentees have provided a means for identifying documents held in metal cabinets, there still remains a need for changing or modifying the ID codes and/or other data in RFID tags attached to documents held in many different types of storage units U.S. Pat. No. 6,407,665 issued to W. C. Maloney on Jun. 18, 2002, which is incorporated by reference herein in its entirety, discloses a document tracking system for locating file folders in a file cabinet having a plurality of drawers. The file folders are provided with inductive RFID tags and each drawer has an inductive loop antenna attached to the back of the drawer. The loop antenna is connected through flexible cabling to a controller. The other drawers of the cabinet are similarly provided with an antenna which are all coupled to the same controller by means of an electrical buss. A user can request the controller to poll all of the file folders in each drawer to determine if any folders are missing. However, there is still a need to change or modify the data stored in each RFID tag held in the file cabinet.

BRIEF SUMMARY

According to one aspect, there is provided a system for automatically indexing printed documents comprising a database for maintaining indexing data indicative of the identity and location of a plurality of printed documents, a processor interfacing with the database and a printing device for printing the printed documents. The processor produces a document file which is fed electronically to the printing device, the document file containing both a printable content and an associated RFID taggable content including the indexing data stored in the database. The printing device includes a controller and an RFID tag writer. The controller directs the printable content to the printing device and the taggable content to the RFID writer. An RFID tag dispenser may be employed to apply the tag containing the indexing data to the document before or after the document exits the printing device. The system may further include a storage unit for storing the tagged documents in a plurality of file folders having a separate RFID tag attached to each file folder.

According to another aspect, there is provided a printing apparatus for printing documents and applying an RFID tag to at least one of the printed documents. The printing apparatus includes a marking device for printing each document and an RFID tag writer for installing indexing data onto the RFID tag. An RFID tag dispenser may also be provided in the printing apparatus for applying the RFID tag to the documents before or after they have been printed. The tag dispenser may be embedded within the printing apparatus and may be located ahead of the printing output or tray.

In still another aspect, there is provided a storage unit for storing a plurality of printed documents, at least one of which has an RFID tag attached thereto. The storage unit comprises an outer case and a plurality of file folder retainers for holding a plurality of file folders within the case, each of the file folders holding at least one printed document. At least one file folder and document has an RFID tag attached thereto, the tag containing indexing data indicative of the identity and location of the folder and document. An RFID reader is associated with the storage unit and addresses and reads the RFID tags attached to both the documents and file folders. Also associated with the storage unit is an RFID writer for addressing and installing or changing the stored data within an RFID tag relative to the identify and location of the document. A two-way communicating device, such as a transceiver, may also be associated with the storage for wirelessly transmitting indexing data between the RFID tags and a remotely located database. A warning device may also be associated with the storage unit for indicating when a printed document has been erroneously placed inside a file folder.

In yet another aspect, there is provided a method for automatically indexing printed documents comprising compiling a database including indexing data indicative of the identity and location of the documents; creating printable data or content for the documents; creating an RFID taggable content containing the indexing data; merging the printable and taggable contents into a document file; communicating the document file to a printer having an associated RFID tag writer, processing the document file to separate the printable and taggable content; directing the printable content to the printer and the taggable content to the RFID tag writer, printing the printable content onto the document, writing the taggable content to an RFID tag; and applying the tag onto the document. The RFID tag may be applied to the sheet medium before the document is printed, during the printing process or after the document has been printed.

The term "printed document" as used herein and in the appended claims, is intended to include any information or data printed onto a paper sheet material, for example, as well as onto other similar media including, but not limited to, fiber board, cardboard, photographic paper and film, microfilm, plastic sheet and film material and generally any kind of sheet or film material on which information and data, including text and photographs, can be printed.

BRIEF DESCRIPTION OF THE DRAWING

Referring now to the drawings, which are exemplary embodiments, wherein like items are numbered alike.

DETAILED DESCRIPTION

Figure 1:
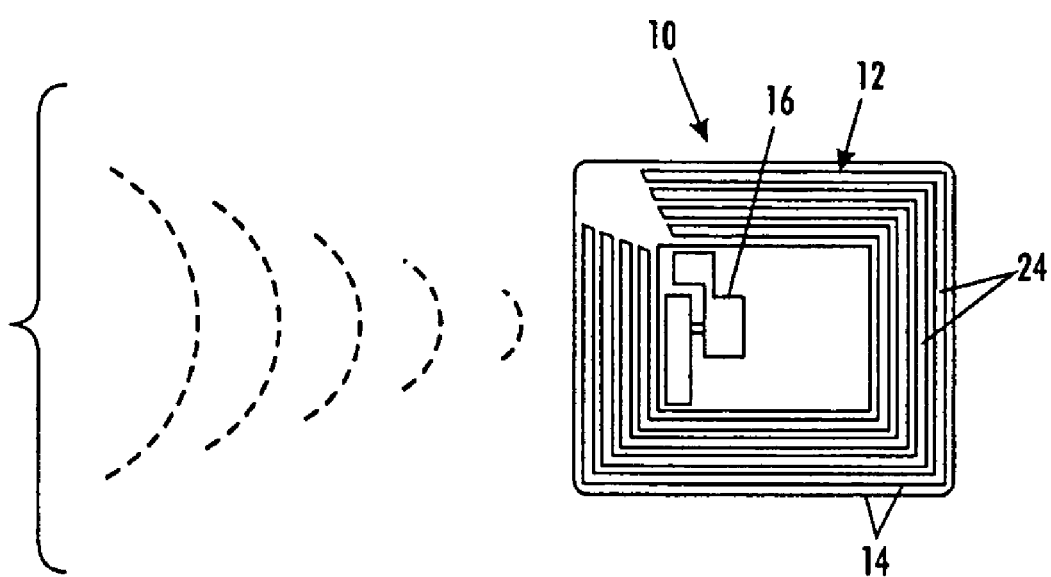
FIG. 1 is a schematic view of a typical RFID tag.
Figure 2:
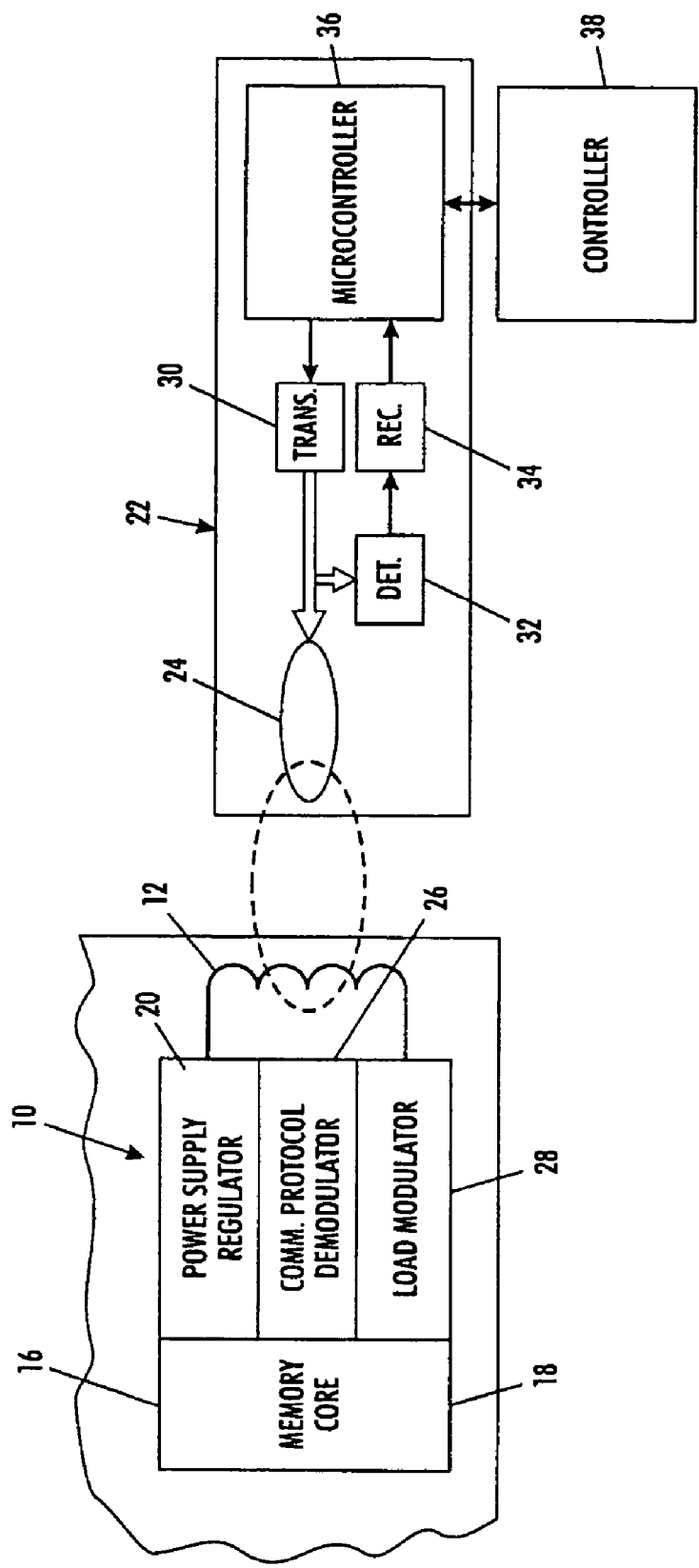
FIG. 2 is a similar view of an RFID tag and associated reader or coupler.

Referring to FIGS. 1 and 2 of the drawings, there is shown a typical RFID tag 10 for use in a system for automatically indexing printed documents. The tag 10 includes a tag antenna 12 composed of a plurality of antenna elements 14 which, in this particular embodiment, are wound in a substantially rectangular pattern and connected to an integrated circuit chip 16, also known as a radio frequency identification chip. Within the tag 10, data storage and processing as well as radio frequency (RF) communication functions are performed by the RF identification chip 16.

As shown in FIG. 2, the chip 16 is a passive type and may include, for example, a memory core 18 (e.g. an EEPROM or flash memory), which stores the data, a power supply regulator 20, which rectifies and otherwise conditions alternating current induced in the antenna 12 by a time-varying RF signal provided by a reader or coupler 22 and its antenna 24 for use in the tag 10 as a direct current power source, and receiver/emitter modules 26, 28 (e.g., compatible with the ISO 14443 standard).

The reader 22 includes a transmitter 30 that generates the time-varying RF signal transmitted by the antenna 24. As a result of electromagnetic coupling between the tag antenna 12 and the reader antenna 24, a portion of the RF signal transmitted by the tag antenna 12 enters the reader antenna 24 and is separated from the transmitted signal by a detector 32 (e.g., an envelope detector). The separated signal is passed to a receiver 34, where it is amplified, decoded and presented via a microcontroller 36 to a controller 38, which may be a host computer, for example.

Figure 3:
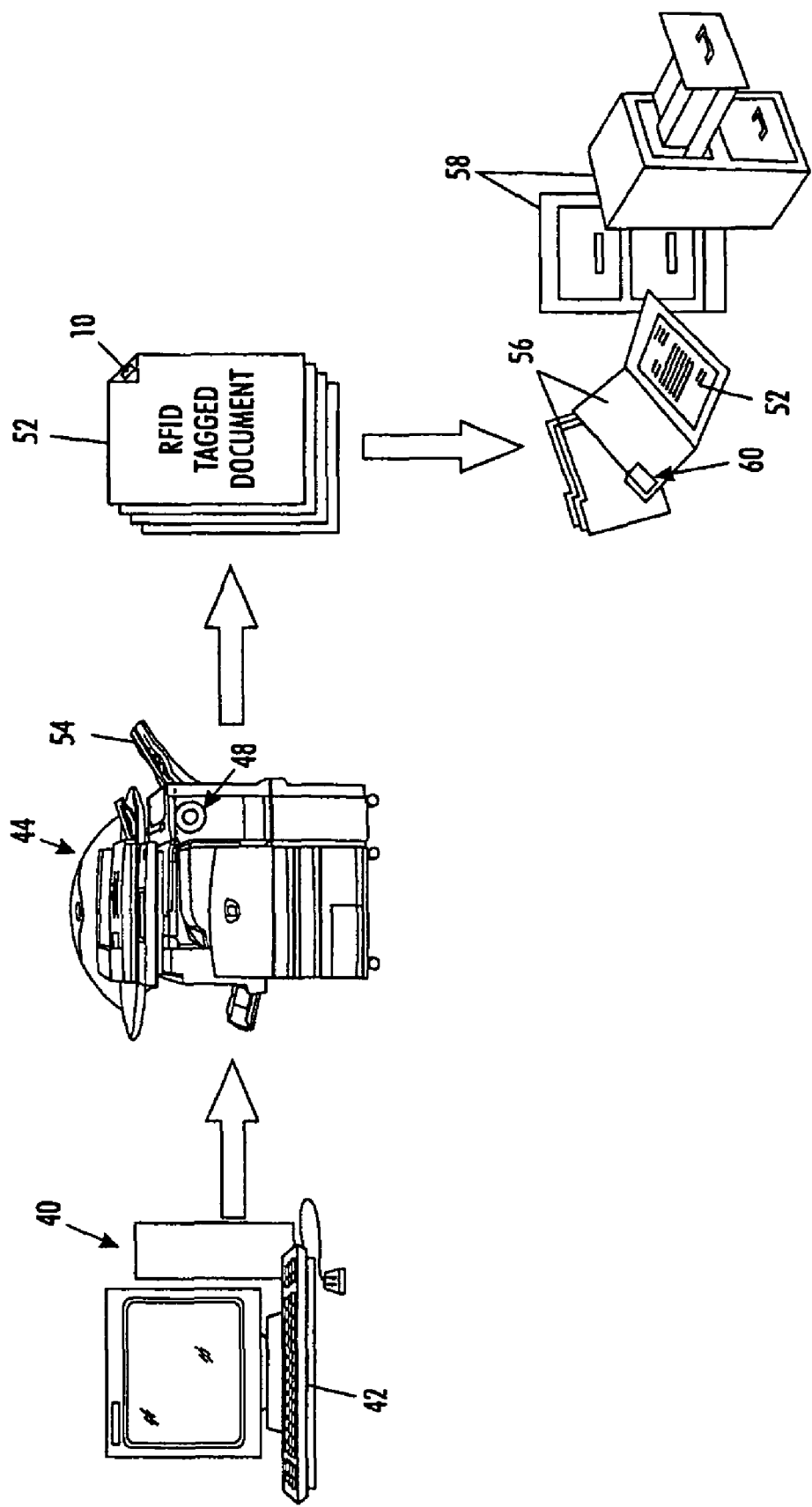
FIG. 3 is a schematic view of a system for automatically indexing printed documents employing an RFID enabled printer.
Figure 4:
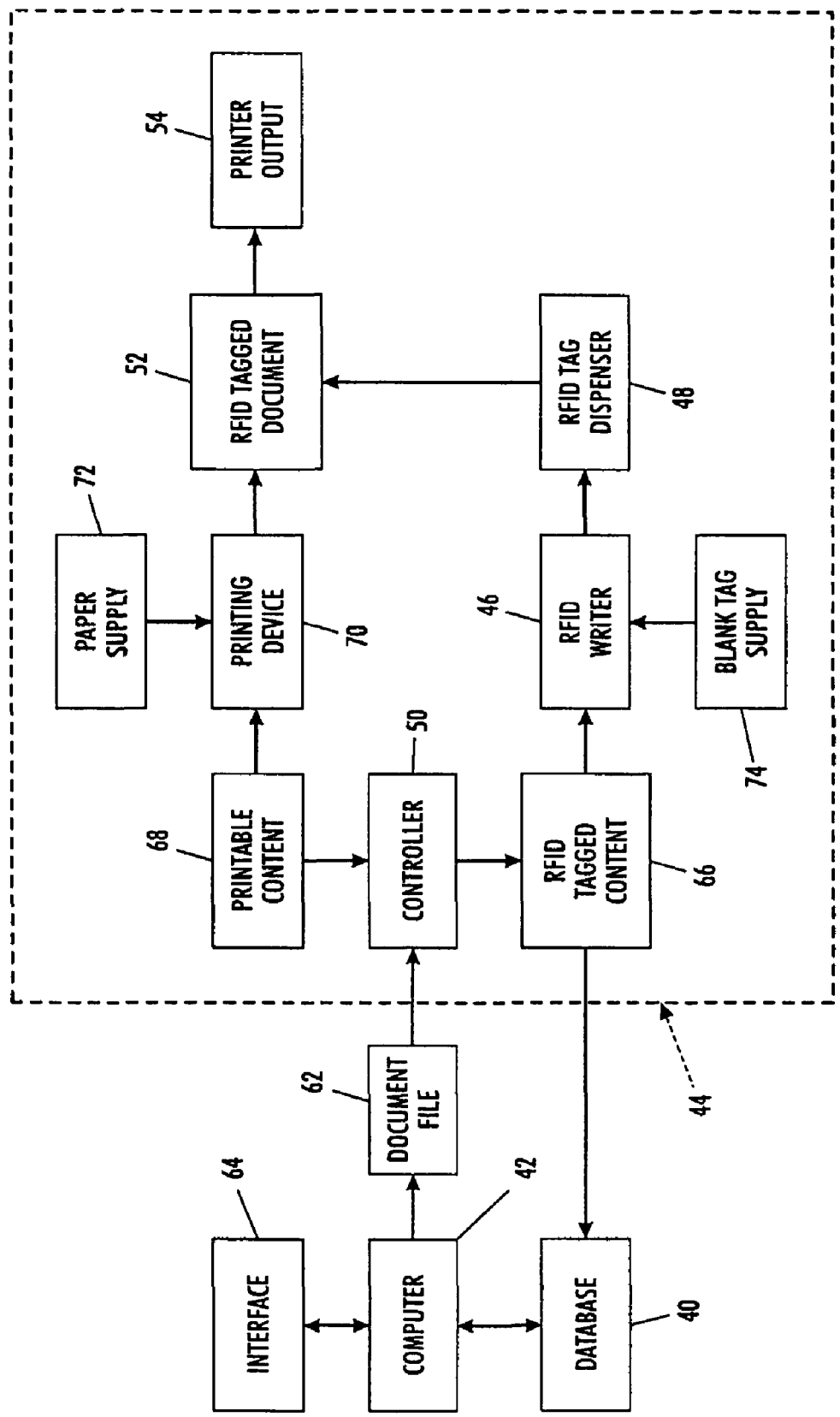
FIG. 4 is a similar view illustrating the components and operation of an RFID enabled printer.

Referring now to FIGS. 3 and 4, there is shown an RFID system for automatically indexing and managing printed documents in a typical office environment. The system includes a database 40, which may be created and maintained by a host computer 42, and an RFID enabled printer 44. The printer 44 may be any standard type office printer equipped with the usual components, such as a marking device, toner, fuser rolls and media supply such as plain paper sheets. However, the printer 44, in this case, is equipped with an RFID writer 46 (see FIG. 4), an RFID tag dispenser 48 and a print controller 50. The print controller 50 is configured to handle the RFID indexing data or taggable content as well as the usual print content for printing the documents 52. The RFID tag dispenser 48 may be a separate unit for attaching or printing the RFID tags 10 directly onto the documents 52 or the tag dispenser and RFID writer may be combined into a single unit as shown in FIG. 3.

In the illustrated embodiment, the RFID tags 10 are applied to the printed documents 52 after the documents have been printed but before they exit the printer 44, usually via an output station 54. The tag 10 may be placed onto only the first page of the document, on all pages or just on a title page, for example. As shown in FIG. 3, the tag 10 is placed on the backside of the printed document 52 as shown by the folded-down right hand corner facing the front of the document. This location is ideal since it is non-intrusive to reading or handling of the document and yet is readily accessible to both the RFID writing and reading processes.

Once an RFID tag 10 has been printed and attached to a document 52, the document is transferred to a file folder 56 for safe-keeping in an assigned area, such as a file cabinet 58 or other storage unit. The term "file folder" as used herein and in the appended claims is intended to mean a real or physical file folder as distinguished from a virtual file that might be used in a virtual world. Typical file folders that may be used include bi-fold, side-fold, expandable and tri-fold file folders as well as various types of binders, jackets, dockets, envelopes, boxes, cartons, clips and generally anything that can retain or hold together a plurality of printed documents.

A separate RFID tag 60 is then attached to the file folder 56 to identify the folder as well as the document 52 and its location inside the file cabinet 58. The RFID tag 60 can also be employed to identify a particular class or category of files to which the document 52 belongs and which should be kept in a separate location inside the cabinet 58.

FIG. 4 shows schematically the components and operation of the RFID enabled printer 44. The RFID tags 10 are created and attached to the documents 52 at the time of printing in a non-intrusive operation. As shown, the computer 42 prepares or publishes the document file 62 that communicates both the printable content of the document and an RFID taggable content to the print controller 50. The printable content is normally created at the computer 42 and is stored in the database 40 as an electronic copy of the document 52. The taggable content may be created by the computer 42 and may also be stored within the database 40. The taggable content includes appropriate RFID indicator markings which are indicative of the identity and location of the document 52 when placed inside a file folders 56 and stored in the file cabinet 58. The user or creator loads the document file 62 appropriately so that it can be leveraged or used by all the day-to-day office applications from which printing can be invoked. Usually, at the time of printing, any office application can be employed to print the document 52.

The database 40 contains all of the information extracted from the document 52 received by the controller 50 such as electronic copy of the document, the indexed content such as document ID, summarized content, key words in the document, meta-data such as username, time of printing, job data, etc. It is this database that helps to deal with the size of the indexed data, that is, if the size of the data is too large to fit into the RFID tag memory, only an appropriate URL or a pointer will go on the RFID memory and that pointer will point to the content stored in the database 40. The database 40 may be associated with the computer 42 as shown in FIGS. 3 and 4 or it may be located in another area or part of the system, for example, the database may be located inside the printer 44.

The document file 62 computes the markings or indexing which include all of the key terms included in the document, compressed byte-stream of the entire content or the content as-is, summary of the content, any automated classification information, subject, key word, author, etc. In general, any of the electronic indexing techniques can be employed to create the taggable content of the RFID tag 10. The document file 62 adds all the index information with clear identification marks into the same file that includes the traditional printable content. The document file 62 can also be configured to produce an interface 64 associated with the host computer 42 for the user's input of any desired modification of the RFID content.

Once the print job has been created, the document file 62 is transferred to the print controller 50 inside the printer 44. The print controller 50 parses the print job and identifies the RFID taggable content 66 and the printable content 68. The print controller 50 delivers the printable content 68 in a traditional way to the printing or marking device 70 and the RFID content 66 to the RFID writer 46 The marking device 70 prints the printable content onto plain paper from the paper supply 72 while the RFID writer 46 electronically embeds the applicable indexing data onto a blank RFID tag 10 from the tag supply 74. The RFID tag dispenser 48 attaches the data loaded tag 10 onto the printed document 52, ideally on the back side of the document as described above. It is contemplated that the tag 10 can be allocated to any specific page, the first or last page, for example, and can be attached to either side of the printed document.

In the embodiment illustrated, the tag dispenser 48 is located between the printing or marking device 70 and the printer output 54 so that the RFID tag 10 can be attached to the document 52 as it exits the printer 44. It is contemplated, however, that the tag dispenser 48 may be independent of the printer 44, located either ahead of the printer or after the printer, in the disclosed system. In fact, the tag dispenser 48 may be eliminated altogether in a system that employs a medium, such as paper sheets, that are manufactured with an RFID tag already attached to or embedded within the medium at the paper mill. The tag dispenser 48 also would not be required in systems employing a printer 44 capable of printing the RFID tag directly onto the sheet medium during the printing process. In all such cases, of course, the printer 44 may still employ an RFID writer for electronically loading the indexed data and/or other information onto the printed RFID tag.

The RFID tags 10 can be created for the file folders 54 shown in FIG. 3 using standard writing processes or by using the above described printing operation that is employed for creating and attaching document tags. The folder tags 60 can describe the overall nature of the documents as well as the class/category of the documents to be contained in each folder.

Figure 5:
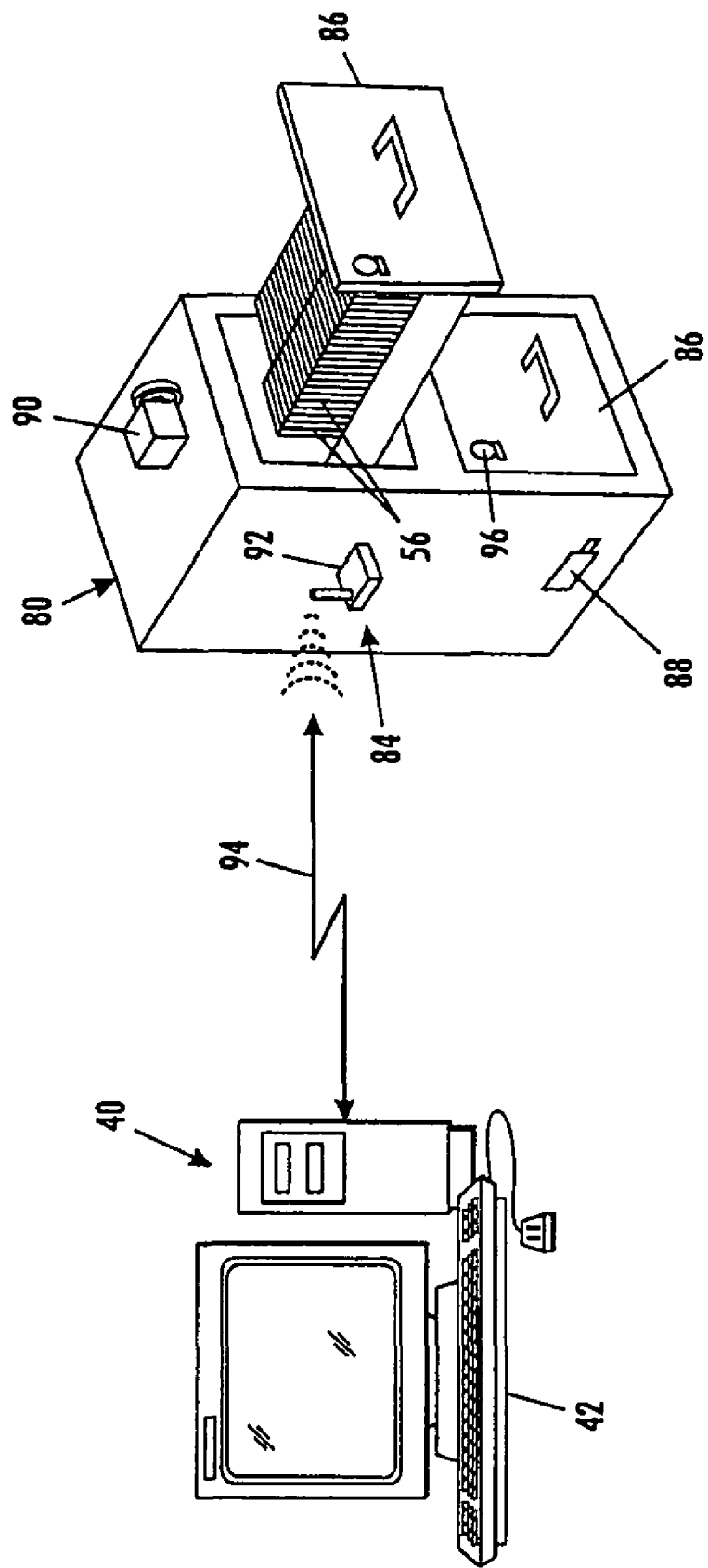
FIG. 5 is a schematic view of a modification of the system shown in FIG. 3.

Turning now to FIG. 5, there is shown one example of a storage unit that may be employed for storing a plurality of file folders 56 and documents 52 retained inside the folders. The exemplified storage unit is a rectangular shaped cabinet 80 having an outer metal case 84 provided with two separate sliding drawers 86, one of which is shown in an open position exposing the plurality of file folders 56. It is contemplated, however, that many other types of storage units besides the cabinet 80 may be employed for storing the plurality of file folders 56 and printed documents 52. For example, the storage unit may be a box, a bookcase or bookshelves, stacked file retainers, a whole room or section of a room having dividers or more broadly any space having a perimeter which defines an enclosure.

The documents 52 each have an RFID tag 10 attached thereto and each file folder 56 has an RFID tag 60 attached in the same way as shown in FIG. 3 An RFID reader or coupler 88 is embedded within the cabinet 80 to detect and read all identifiable document and folder tags 60 inside the cabinet 80. Multiple readers 88 are preferred and may be located within each drawer 86, for example. Metal cabinets are best suited for this embodiment since they deter RF transmission and exclude all RFID tags outside the cabinet from being erroneously read by the RFID reader 88.

Also disposed within the cabinet 80 is an RFID writer 90 for addressing, installing or changing the stored data within each RFID document tag 10 and folder tag 60 relative to the identity and location of each document 52 and each folder 56, respectively. A two-way communication device 92, such as a transceiver, is disposed inside the cabinet 80 for wirelessly receiving and transmitting indexing data between a remotely located database, such as the database 40, and one or more of the RFID document/folder tags 10, 60, respectively. The RFID tag writer 90 can be used for writing any updates to the document/file folder tags 10/60 coming from the database via the connectivity channel 94 provided by the transceiver 92 and for updating the folder tags 60 as and when new documents are filed. This system can also verify the correct placement of the documents 52 in the right file folders 60 by cross checking the general category assigned to the documents as well as the content of any new document. It is important to note that the data embedded in each RFID tag 10, 60 is always linked directly to a database, such as the database 40, as depicted by the arrowed line in FIG. 4. Any changes made in the file system, such as updating the tags 10, 60 assigned to the documents 52 and folders 60 are registered and maintained by the database even though made by the RFID writer 90 within the cabinet 80. A warning device 96 may also be provided for indicating when a printed document has been erroneously placed inside a wrong file folder.

The RFID reader 88 and the RFID writer 90 embedded in the file cabinet 80 can not only read/write the RFID tags 10, 60 and their content, they can also sense if and when the file folders 56 are taken out of the cabinet 80. When a folder is taken out, the system quickly checks which of the document tags 10 went out by taking an inventory of all the documents in the database 40 which are assigned to the cabinet 80 and to its individual drawers 86. Also by associating the documents 52 with their assigned folders 56, the system can easily determine which specific folders were taken out with the documents 52 when removed from the cabinet 80. Over a period of time while checking its inventory in the database 40, the system actually begins to learn about which folders 56 have what documents 52 and, more importantly, if there are any documents 52 that are erroneously filed in the cabinet 80. Such an error can occur, for example, if a document 52 is in a particular folder 56 which is different from what the indexed database 40 indicates on the computer 42. Similarly, a smart software could be employed to compare the keywords and other data associated with the document 52 and compare it to the information associated with a particular folder 56.

As the number of documents 52 and folders 56 accumulate in the file and storage system, a more finely tuned indexing process based on sub-categories may be required. Also, as documents 52 need to be archived, aggregation of different categories may also be needed. Such requirements can be accomplished electronically by a computer in a manner similar to the way electronic files and folders are handled today. Thus, if sub-categories are created for any group of documents 52 or file folders 56, these changes are automatically communicated by a host computer to a database, such as the database 40, and corresponding data is then updated on both the RFID tags 10 and the folder tags 60. The physical documents that are regrouped into a new folder electronically may continue to reside temporarily in the same old folder in cabinet 80. However, the next time that the cabinet doors 86 are opened or closed, the system will show a warning, either on the computer screen or by activating a warning light 96 attached to the cabinet 80, such as to each drawer 86, to encourage office personnel to refolder the documents 52 consistent with the changes made in the database.

What is claimed is:

1. A system for automatically indexing printed documents comprising, in combination:
   a database for maintaining indexing data indicative of the identity and location of said documents;
   a processor interfacing with said database, said processor creating a document file containing both a printable content and an RFID taggable content;
   a printing device for printing said documents including:
      a controller and a first RFID tag writer, wherein said controller directs said printable content to said printing device and said taggable content to said first RFID tag writer;
   an RFID tag attached to at least one of said documents;
   an RFID tag reader, located external to the printing device, for selectively addressing and reading said RFID tag;
   a second RFID tag writer, located external to the printing device, for selectively addressing and changing said indexing data stored in said RFID tag, said RFID tag reader and said second RFID tag writer embedded in a storage unit for said documents; and
   a separate RFID tag attached to a file folder to identify the file folder, where the taggable content is indicative of the identity and location of the document when placed inside the file folder,
   wherein said processor is configured to verify correct placement of the document in the file folder.

2. A system according to claim 1, further including an RFID tag dispenser for attaching said RFID tag to at least one of said documents.

3. A system according to claim 2, wherein said RFID tag dispenser is embedded within said printing device.

4. A system according to claim 3, wherein said printing device has an output and wherein said RFID tag dispenser is located ahead of said output.

5. A system according to claim 1, further comprising a storage unit for storing tagged printed documents and file folders for retaining said documents, wherein said storage unit comprises an enclosure defined by an outer perimeter and including means for retaining said documents and said file folders within said perimeter.

6. A system according to claim 5, wherein said storage unit is one of: a cabinet, a box, a bookcase, bookshelves, stacked file trays and a room or section of a room formed by dividers.

7. A system according to claim 6, wherein said storage unit is a cabinet having at least one drawer for retaining said file folders and printed documents.

8. A system according to claim 7, wherein said cabinet is composed of metal.

9. A system according to claim 5, wherein said RFID tag reader is embedded within said storage unit.

10. A system according to claim 9, further including means enabling two-way communications between said database and said RFID tag reader embedded within said storage unit.

11. A system according to claim 5, wherein said second RFID tag writer is embedded within said storage unit.

12. A system according to claim 11, further including means enabling two-way communications between said database and said RFID tag reader embedded within said storage unit.

13. A storage unit for storing a printed document having an RFID tag attached thereto, said storage unit comprising, in combination:
   an outer enclosure;
   an RFID tag reader embedded within said enclosure for addressing and reading said RFID tag;
   an RFID tag writer embedded within said enclosure for addressing and installing or changing data stored within said RFID tag;
   a two-way communications device, disposed within said enclosure, for wirelessly receiving and transmitting data between a remote database and said RFID tag; and
   a warning device, separate from said RFID tag reader and attached to said enclosure, for indicating an erroneously installed document.

14. A storage unit according to claim 13, further including a two-way communications device between a remote database and said RFID tag writer embedded within said storage unit.

15. A storage unit according to claim 13, wherein said storage unit has retained within said enclosure a plurality of documents and a plurality of file folders, and the file folders are selected from: bi-fold, side-tab, expandable and tri-fold file folders, binders, jackets, dockets, envelopes, boxes, cartons and clips.

16. A storage unit according to claim 13, wherein said enclosure is one of: a cabinet, a box, a bookcase, bookshelves, stacked file tray and a room or section of a room formed by dividers.

17. A storage unit according to claim 13, wherein said outer enclosure is composed of metal.

18. A storage unit according to claim 16, wherein said enclosure is a cabinet having at least one drawer for retaining file folders and a plurality of printed documents.

19. A storage unit according to claim 18, wherein said enclosure is a cabinet having a plurality of drawers for retaining said printed documents and file folders and wherein the warning device is attached to at least one of said drawers for indicating an erroneously installed document.

20. A method for automatically indexing printed documents, comprising:
creating a printable content for said documents;
compiling a database including indexing data indicative of the identity and location of said documents;
creating an RFID taggable content containing said indexing data;
merging said printable and taggable contents into a document file;
communicating said document file to a printer;
processing said document file to separate said printable and taggable content;
directing said printable content to said printer and said taggable content to an RFID tag writer;
printing said printable content onto at least one of said documents;
inserting a pointer into said taggable content directed to said indexing data stored in said database;
writing said taggable content to at least one RFID tag including a tag memory, so that said RFID tag is associated with a document and has stored therein the pointer directed to the indexing data for that document
attaching the RFID tag to the document; and
attaching a separate RFID tag to a file folder to identify the file folder, where the taggable content is indicative of the identity and location of the document when placed inside the file folder; and
verifying correct placement of the document in the file folder,
wherein the tag memory is insufficient to store the indexing data, so that at least a portion of the indexing data is not stored in the tag memory but is stored in the database.

21. A method according to claim 20, further including the step of associating said RFID tag with said at least one of said documents before said printable content is printed.

22. A method according to claim 21, wherein said RFID tag is embedded within said at least one of said documents.

23. A method according to claim 22, further including the step of communicating data between said database and said RFID reader via a wireless transmission device associated with said storage unit.

24. A method according to claim 22, further including the step of writing data to said RFID tags while in said storage unit.

25. A method according to claim 24, wherein said RFID tags are written to by an RFID writer attached to said storage unit.

26. A method according to claim 24, further including the step of communicating data between said database and said RFID writer via a wireless transmission device associated with said storage unit.

27. A method according to claim 20, further including the step of associating said RFID tag with said at least one of said documents at substantially the same time that said printable content is printed.

28. A method according to claim 27, wherein said RFID tag is attached to said one of said documents by an RFID tag dispenser associated with said printer.

29. A method according to claim 28, wherein said printer has an output and wherein said RFID tag is attached to said one of said documents by said RFID dispenser ahead of said output.

30. A method according to claim 20, further including the step of associating said RFID tag with said at least one of said documents after said printable content has been printed.

31. A method according to claim 30, wherein said RFID tag is embedded within said at least one of said documents.

32. A method according to claim 30, wherein said RFID tag is attached to said at least one of said documents.

33. A method according to claim 32, wherein said printer has an output and wherein said RFID tag is attached to said one of said documents by an RFID tag dispenser located after said output.

34. A method according to claim 20, wherein said pointer is a URL.

35. A method according to claim 20, further including the step of storing the RFID tagged documents in a storage unit.

36. A method according to claim 35, wherein said storage unit comprises an enclosure defined by an outer perimeter and including means for retaining said printed documents within said enclosure.

37. A method according to claim 36, wherein said enclosure is one of: a cabinet, a box, a bookcase, bookshelves, stacked file retainer and a room or section of a room formed by dividers.

38. A method according to claim 35, further including the step of reading said RFID tags while in said storage unit.

39. A method according to claim 38, wherein said RFID tags are read by an RFID reader attached to said storage unit.

* * * * *